US012516952B2

(12) United States Patent
Porębski

(10) Patent No.: US 12,516,952 B2
(45) Date of Patent: Jan. 6, 2026

(54) ENVIRONMENTAL REFERENCE MAP BUILDING BASED ON OCCUPANCY GRID

(71) Applicant: Aptiv Technologies AG, Schaffhausen (CH)

(72) Inventor: Jakub Porębski, Cracow (PL)

( * ) Notice: Subject to any disclaimer, the term of this patent is extended or adjusted under 35 U.S.C. 154(b) by 99 days.

(21) Appl. No.: 18/539,176

(22) Filed: Dec. 13, 2023

(65) Prior Publication Data

US 2024/0200970 A1  Jun. 20, 2024

(30) Foreign Application Priority Data

Dec. 14, 2022  (EP) ..................................... 22213401

(51) Int. Cl.
*G01C 21/00* (2006.01)
*G01S 17/89* (2020.01)

(52) U.S. Cl.
CPC ...... *G01C 21/3811* (2020.08); *G01C 21/3837* (2020.08)

(58) Field of Classification Search
CPC   G01C 21/3811; G01C 21/3837; G01C 21/38; G01S 17/89
See application file for complete search history.

(56) References Cited

U.S. PATENT DOCUMENTS

| 11,619,497 | B2* | 4/2023 | Yang | ..................... G05D 1/0274 |
| | | | | 701/469 |
| 2010/0274469 | A1* | 10/2010 | Takahata | ............ G01C 21/3896 |
| | | | | 701/532 |
| 2021/0131823 | A1* | 5/2021 | Giorgio | ................ G06V 10/803 |
| 2022/0197301 | A1* | 6/2022 | Moawad | ................ G01S 13/876 |
| 2023/0036838 | A1* | 2/2023 | Slobodyanyuk | .... B60W 60/001 |

FOREIGN PATENT DOCUMENTS

EP    4016115 A1    6/2022

OTHER PUBLICATIONS

Extended European Search Report for EP App. No. 22213401 dated Sep. 15, 2023, 10 pages.
Jo et al., "Cloud Update of Tiled Evidential Occupancy Grid Maps for the Multi-Vehicle Mapping," Sensors 2018, 18 (12), 4119; https://doi.org/10.3390/s18124119.

(Continued)

*Primary Examiner* — Tan Q Nguyen
(74) *Attorney, Agent, or Firm* — Miller Johnson

(57) ABSTRACT

Disclosed is a method for building a reference map. The method includes accumulating perception sensor data for a vehicle moving through an environment. The method includes generating an occupancy grid from the accumulated sensor data as the vehicle moves. The cells in the occupancy grid have a status and a confidence characteristic associated with the respective cell status determined based on the accumulated data. The method includes building a reference map for the environment by recording reference map cell states based on the confidence characteristics of respective cell statuses in the occupancy grid. In response to the recording reference map cell states, each reference map cell is assigned a single state based on the confidence characteristics associated with the respective cell. The step of building the reference map further includes recording a weight associated with each assigned reference map cell state.

13 Claims, 2 Drawing Sheets

(56) References Cited

OTHER PUBLICATIONS

Wolcott et al., "Robust LIDAR localization using multiresolution Gaussian mixture maps for autonomous driving," The International Journal of Robotics Research, vol. 36, Issue 3, 2017.
Clemens et al., "β-SLAM: Simultaneous localization and grid mapping with beta distributions," Information Fusion, vol. 52, Dec. 2019.
Berger et al., "Direct Geometrical Map to Low-Level Grid Map Registration for Robust Online Localization," 2018 21st International Conference on Intelligent Transportation Systems (ITSC), Maui, HI, USA, 2018, pp. 2223-2230, doi: 10.1109/ITSC.2018.8569784.
Poggenhans et al., "Precise Localization in High-Definition Road Maps for Urban Regions," 2018 IEEE/RSJ International Conference on Intelligent Robots and Systems (IROS), Madrid, Spain, 2018, pp. 2167-2174, doi: 10.1109/IROS.2018.8594414, 8 pages.

* cited by examiner

ENVIRONMENTAL REFERENCE MAP BUILDING BASED ON OCCUPANCY GRID

CROSS-REFERENCE TO RELATED APPLICATIONS

This application claims priority to European App. No. 22 213 401 filed Dec. 14, 2022, the entire disclosure of which is incorporated by reference.

FIELD

The present disclosure relates to a method of building a reference map and, in particular, automotive reference maps for use in advanced driver assistance systems and autonomous driving technologies. The disclosure also concerns updating an existing reference map which may, for example, be stored in a central server. Moreover, the disclosure concerns automotive electronic control units and software for implementing the above methods.

BACKGROUND

Many modern vehicles are fitted with perception sensor systems, such as RADAR, LIDAR and cameras, to provide localization data. Typically, sensor data from multiple sensors are fused to provide for more accurate localization of the vehicle on the road. For example, a global positioning system (GPS) sensor will not provide a sufficiently high enough level of accuracy on its own, and whilst camera systems can be very effective, their performance will be lower in some situations and conditions, such as in heavy rain, fog, or snow. As such, these systems will often be combined with RADAR and/or LIDAR, and be processed to filter out noise and weight results to provide a higher confidence that localization determinations are accurate.

In this respect, automotive systems often use occupancy grid mapping to generate localization maps of the ego vehicle's environment from noisy and uncertain sensor measurement data. An occupancy grid provides a representation of a map of the environment in the form of an evenly spaced field of random variables each representing the probability of an obstacle existing at that location in the environment. For example, in an evidential occupancy grid, each cell state may hold evidences of multiple hypotheses. For example, in a three-state evidential occupancy grid, each grid cell keeps track of evidences of the cell having a static, dynamic and free status. However, because of the processing demands and the range limitations of the sensor systems, occupancy grids are limited to only the current local environment of the ego vehicle.

Accordingly, to further improve localization capabilities in vehicles, automotive systems also make use of a reference map, which provides more limited information on constant landmarks in the environment, but for a much larger geographical area (e.g. the whole region or country). As such, the reference map may be used for instance to aid the planning of future trajectories or help with vehicle perception outside of the immediate local area (e.g. advanced warning before a tight turn). However, because of the large area needed to be covered, they contain only the most relevant information to limit the data size of the reference map.

In view of the above, the generation and maintenance of accurate reference maps is important for the accurate localization of vehicles. Therefore, there remains a need for improved methods and systems for generating reference maps.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

According to a first aspect, there is provided a method for building an reference map comprising the steps of: accumulating perception sensor data for a vehicle moving through an environment; generating a occupancy grid from the accumulated sensor data as the vehicle moves, wherein cells in the occupancy grid have a status and a confidence characteristic associated with the respective cell status determined based on the accumulated data; and building a reference map for the environment by recording reference map cell states based on the confidence characteristics of respective cell statuses in the occupancy grid.

In this way, a reference map may be generated from the occupancy grid as the vehicle moves and its sensors accumulate data. As such, as the same objects are detected over number of sensor cycles, confidence of their location increases. The most relevant information may be extracted from the occupancy grid based on the confidence characteristic determined from the accumulated sensor data meeting predetermined criteria. That is, a state may be assigned to each cell in the reference map based on the state having a sufficiently high confidence. This acts to filter the data being recorded into the reference grid, and thereby minimizes the memory size needed for storage.

In various embodiments, the step of building the reference map comprises recording reference map cells as having an occupied state based on the respective cell statuses in the occupancy grid having confidence characteristics meeting one or more criteria. For instance, a cell may be identified as occupied with a static object if the sensor data indicates a high belief it is occupied over a plurality of sensor cycles.

In various embodiments, the step of building the reference map comprises recording reference map cells as having an unoccupied state based on the respective cell statuses in the occupancy grid having confidence characteristics meeting one or more criteria. For example, a cell may be identified as unoccupied if the sensor data indicates a high belief that it is free of objects over a plurality of sensor cycles. Equally, if an occupancy grid cell shows a dynamic state over a number of cell cycles, exhibiting evidence of both being occupied and unoccupied, this high entropy characteristic may be used to determine that an unoccupied state should be recorded in the reference grid.

In various embodiments, when recording reference map cell states, each reference map cell is assigned a single state based on the confidence characteristics associated with the respective cell. In this way, duplicate data is not recorded for each cell, thereby minimizing the size of the reference map.

In various embodiments, the step of building the reference map further comprises recording a weight associated with each assigned reference map cell state. In this way, although a single state may be assigned to each cell, a confidence or weighting corresponding to the original local perception state from the sensor data may be recorded. This may be used in postprocessing and, for instance, to allow for determination during subsequent updating of the reference map.

In various embodiments, the perception sensor data comprises radar data. In this way, radar data, which is relatively noisy, may be filtered through the reference map building process to assist with the generation of an accurate reference map.

In various embodiments, the occupancy grid comprises a plurality of occupancy grid scans generated by a plurality of sensor scan cycles. In this way, data from one or more sensor systems may be fused and accumulated over time to provide accurate determination.

In various embodiments, the confidence characteristic associated with the respective cell statuses comprises an impact weighting based on the position of the cell relative to the ego vehicle. For example, a lower impact may be assigned to the grid cells in front of the vehicle, and higher impact to the closer cells and objects behind the ego vehicle. This may thereby recognize that cell confidence is lower far in front of the vehicle because there isn't time to accumulate enough evidence to converge into a stable measurement/determination. However, as the ego vehicle moves closer to the obstacle and eventually passes it, sensor measurements are accumulated and the cell state converges into a stable measurement, thereby providing a higher confidence and less noise.

In various embodiments, the method may further comprise the step of uploading the generated reference map to a server. In this way, the generated reference map may be stored centrally, for example for use by other vehicles.

In various embodiments, the generated reference map is represented as a point cloud.

According to a second aspect there is provided an automotive electronic control unit comprising: an input for receiving perception sensor data for a vehicle moving through an environment; an occupancy grid generating block for generating a occupancy grid from the accumulated sensor data as the vehicle moves, wherein cells in the occupancy grid have a status and a confidence characteristic associated with the respective cell status determined based on the accumulated data; and a reference map building block for building a reference map for the environment by recording states for reference map cells based on the confidence characteristics of respective cells statuses in the occupancy grid. In this way, an automotive electronic control unit, such as a multidomain controller or other body control module, may be provided for implementing the above method. It will be understood that in other embodiments, processing may be implemented on a server. For example, perception sensor data may be transmitted from the vehicle to the cloud, where it is processed, and the resultant reference map is accessible by a large number of vehicles.

According to a third aspect, there is provided a method of updating an automotive reference map, comprising the steps of: accumulating perception sensor data for a vehicle moving through an environment; generating a occupancy grid from the accumulated sensor data as the vehicle moves, wherein cells in the occupancy grid have a status and a confidence characteristic associated with the respective cell status determined based on the accumulated data; and updating a stored reference map for the environment by comparing stored states for reference map cells with respective cells statuses in the occupancy grid and updating the stored states where the confidence characteristics for the respective cell status meet an update criteria. In this way an existing reference map may be updated by sensor data accumulated over time. As such, the stored reference may be improved over time and adapt as new road features are installed.

In various embodiments, the update criteria are met if the confidence characteristics for the cell statuses indicate a higher confidence level than the weight assigned to the respective stored reference map cell state. In this way, a more confident later determination may be used to override an existing stored state.

According to a fourth aspect, there is provided a method of updating an automotive reference map stored at a server, comprising the steps of: receiving reference map data from a vehicle moving through an environment, wherein the reference map data has been generated for the environment by recording reference map cell states based on the confidence characteristics of respective cell statuses in a occupancy grid generated from accumulated perception sensor data at the vehicle; and updating the stored reference map for the environment by comparing the recorded reference map cell states in the reference map data with the respective cell statuses in the stored reference map and updating the stored states where the confidence characteristics for the respective cell status meet an update criteria. In this way, an existing reference map stored at a server may be updated by sensor data accumulated by one or more vehicles over time. As such, the stored reference map may be improved over time and adapt as new road features are installed.

According to a fifth aspect, there is provided a non-transient computer readable medium comprising instructions which, when executed by a computer, implement the above method.

According to a sixth aspect, there is provided a computer software product comprising instructions which, when executed by a computer, implement the above method.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

Illustrative embodiments will be described with reference to the drawings.

In the drawings, reference numbers may be reused to identify similar and/or identical elements.

DETAILED DESCRIPTION

Figure 1:
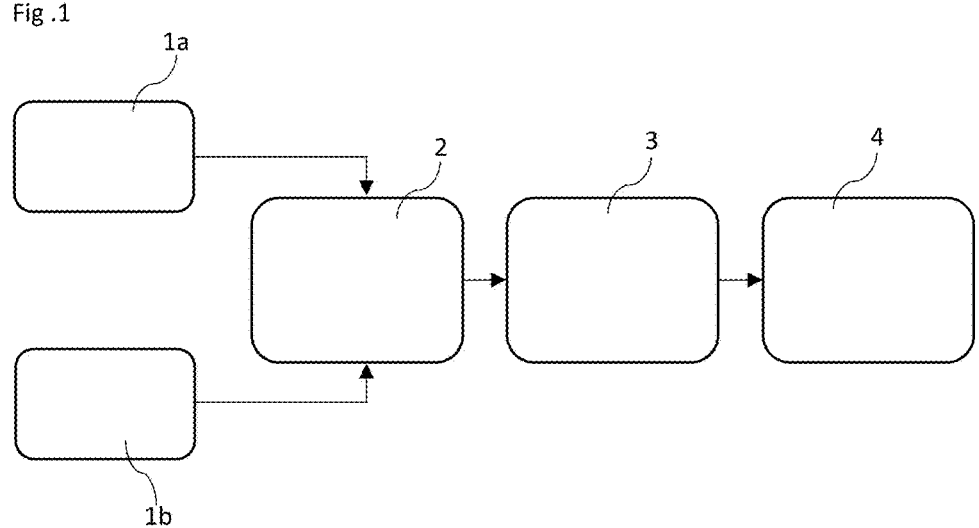
FIG. 1 shows a schematic representation of the method of building a reference map according to a first embodiment.

FIG. 1 shows a schematic representation of the method of building a reference map according to a first embodiment. Block 1a represents local perception data obtained from multiple perception sensors, such as multiple radar sensors, which are provided in the vehicle. At the same time, the vehicle receives a global positioning reference 1b which provides general positioning tracking as the vehicle moves through the environment.

The local perception sensor data 1a and GPS reference 1b are then used in block 2 to create a local perception occupancy grid. This local perception occupancy grid is dynamic in the sense that the grid moves with the ego vehicle as the vehicle moves through the environment. Block 2 may be implemented by an electronic control unit (ECU) within the ego vehicle, with the ECU processing sensor fusion and data filtering to generate the occupancy grid representing the local environment surrounding the vehicle.

The occupancy grid is then used to build a reference map in block 3 which contains only the most relevant information identifying stationary objects within the environment. Again block 3 may be implemented by an electronic control unit (ECU) within the ego vehicle, with the reference map being built by firstly extracting the most relevant information from the occupancy grid and then ensuring that the extracted information is unique to avoid duplication and filter out invalid data.

Figure 2:
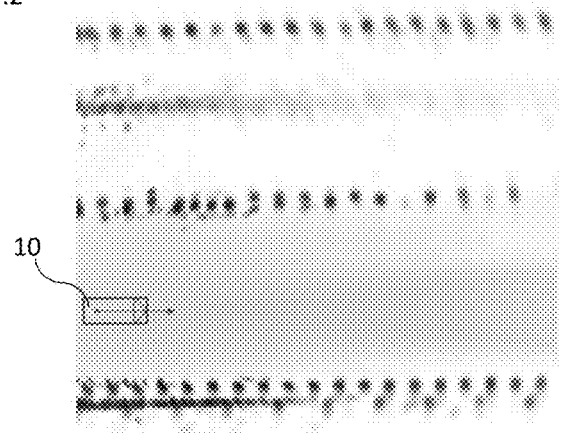
FIG. 2 shows an illustrative example of an occupancy grid generated during the method of the first embodiment.

To explain the above in further detail, FIG. 2 shows an illustrative example of an occupancy grid generated during the method of the first embodiment. As the ego vehicle 10 moves in the environment, in this case from left to right along a road, the local perception sensor systems provide inputs for evidences of cells in the occupancy grid having a stationary, dynamic and free status. As data is accumulated, the confidence associated with each status changes over time as more data is collected. For example, as shown in FIG. 2, sensor detections from cells far away from the ego vehicle 10 are noisy and have a low confidence (see detections in the right side of FIG. 2). However, as more data is accumulated as the vehicle moves closer to an object, the noise is reduced, and confidence increases (see detections in the left side of FIG. 2). The ECU may therefore extract the most relevant information from the occupancy grid based on the perceived state measurement and the associated confidence characteristics.

In this connection, the ECU records a cell as having a particular state in the reference map based on the determined confidence characteristics, such as belief and entropy indicators. For example, if sensor detections indicate the presence of a stationary object, the cell may be considered to have associated high stationary evidence (belief). At the same time, if there is a low conflict between the status associated with a particular cell, it is considered to have a low entropy. Accordingly, confidence characteristics for a state in which the belief is above a predetermined threshold and the entropy is below a predetermined threshold may be used to determine that a cell should be recorded as having the associated state.

Furthermore, as mentioned above, detections relative to the position of the ego vehicle may also have a bearing on the confidence characteristics. In this respect, local perception data is recorded as the vehicle moves and, as more information is accumulated, the cell state is more confident and less noisy. Therefore, in far ranges in front of the vehicle, cell confidence will be lower, because there has not been time to accumulate enough evidence to converge into a stable determination. As the ego vehicle moves closer to the obstacle and eventually passes it, sensor measurements accumulate, and the cell state converges into a stable determination. Accordingly, the processing implemented by the ECU may assign a lower impact to occupancy grid cells further in front of the vehicle and a higher impact to the closer cells and objects behind the ego vehicle.

Determined call states with sufficient confidence characteristics are recorded in the reference map only once. As such, data points from each perception sensor scan aren't duplicated in the output reference map, thereby minimizing data redundancy. This step also has the effect of filtering out cells which are only relevant for a short period of time, such as false positive measurements. Accordingly, the stability of the relevant information is verified.

The reference map builder block 3 follows the movement of the occupancy map and stores information about determined cells states. Once cells are marked as recorded, the marked cell areas aren't recorded again, thereby reducing the number of duplicate data points. As such, the output reference map may be provided as a point cloud, with points identifying the location of objects in the environment space.

In addition to recording cells having an occupied state, the reference map builder block 3 may also mark areas which have a high confidence of being free or dynamic. In the case of dynamic detections, such as other moving vehicles, these may be sensed as being located in certain cells but, since they are moving, the area they are located may be determined to be unoccupied in a long-term sense. These rejected areas can be used to filter out single cell noises which may occur in the perception sensor data.

Figure 3:
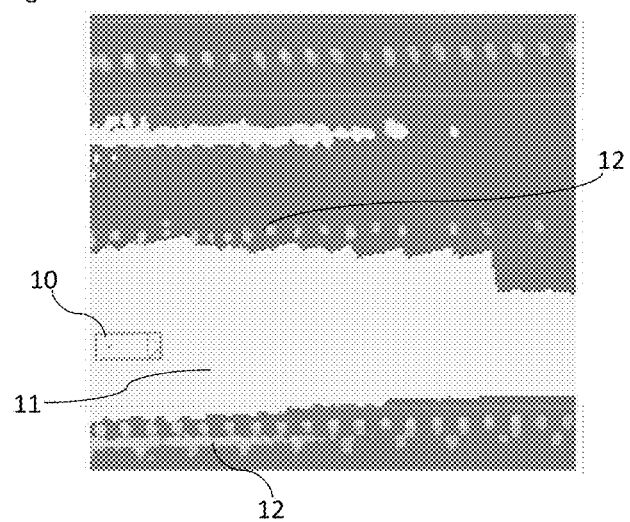
FIG. 3 shows an illustrative example of an internal classification map synchronized to the occupancy map shown in FIG. 2.

In block 4, the reference map is output, for example for transmission to a central server. In this respect, FIG. 3 shows an illustrative example of an internal classification map synchronized to the occupancy map shown in FIG. 2 and used for creating the reference map. As shown the output internal classification map provides a less noisy output with the unoccupied road 11 ahead of the ego vehicle, and detections associated with the guardrails 12 either side. As the vehicle moves forward, states for currently unrecorded cells may be recorded as the accumulated data builds sufficient confidence in their determination.

Figure 4:
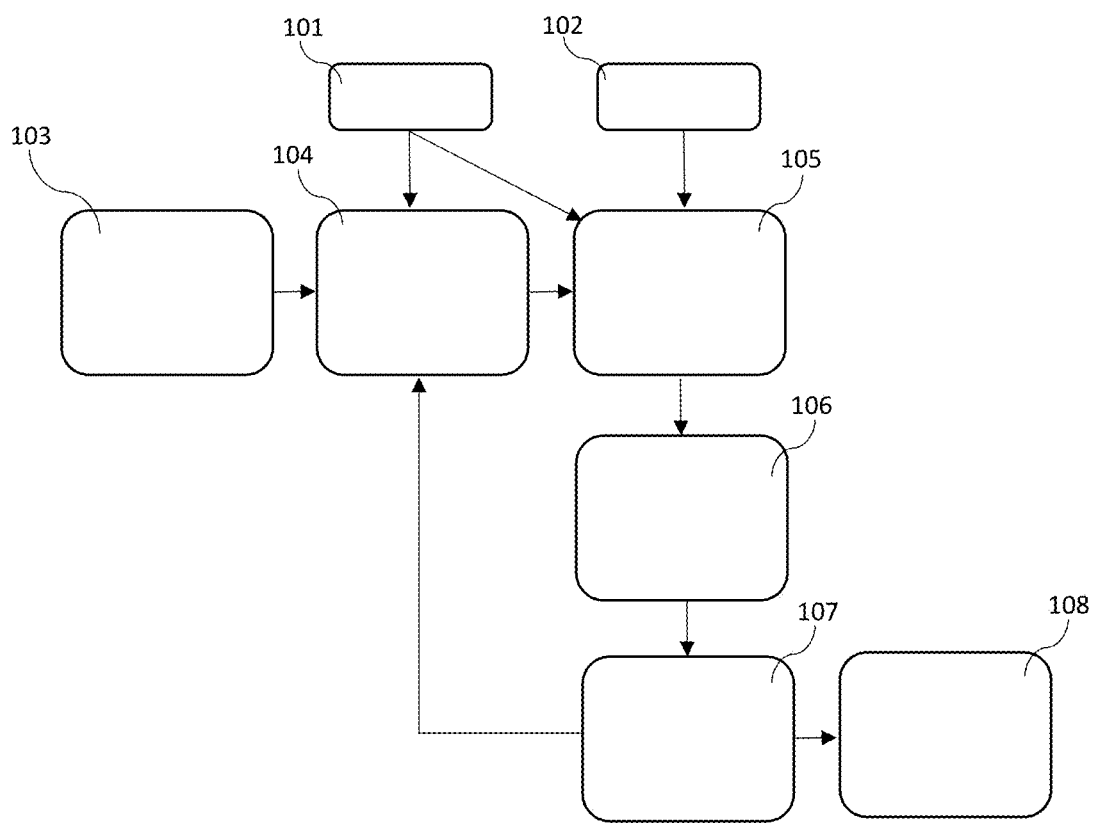
FIG. 4 shows a flow diagram of the reference map building process according to an illustrative embodiment.

In this connection, to explain the method in further detail FIG. 4 shows a flow diagram of the reference map building process according to an illustrative embodiment. In block 103, an empty map is initialized with cell states and weights to establish an internal classification map, like that shown in FIG. 3. The cells may be recorded with cell states such as: "Not updated", "Free", "Candidate", or "Reported". At block 101, a location input is provided for providing the position of the ego vehicle as it moves. In block 104, cells in the internal classification map are shifted with movement of the vehicle. In block 105, the cell states are updated based on confidences, the cell position with respect to the ego vehicle and the presence of conflicting states. In block 105, the shifted internal classification map is updated based on both location input provided by block 101 and the occupancy grid supplied by block 102. In block 106, cells may be marked as "Free" or "Candidate". The weighting for that assigned cell state may also be recorded at this stage. In block 107, cells that have been marked as a "Candidate" cell for a sufficiently long time/number of iterations (indicating a sufficiently high confidence) are reported to the Reference Map as "Reported". In block 108, the list of Reported cells and their associated weights may be output. This may be transmitted, for example, to a server for use in building a centralized reference map.

Accordingly, with the above method, perception sensor data recorded over time by the vehicle may be used to construct a reference map having a better quality than many existing solutions. For example, many prior art reference maps are based on a limited set of features extracted from local perception (e.g. signs, road border, geometrical constraints). As such, they rely on LIDAR and camera sensors and hence are not suited for RADAR sensors. Furthermore, additional tracking or particle filtering steps are often required in existing solutions to filter out noise, which is computationally complex, thereby limiting their real time application.

Furthermore, with the above described method, each cell or datapoint may be labelled with a weight based on the confidence characteristics of the recorded state. These weightings may be used in map postprocessing and to provide for determining whether to update a status in an existing reference map over time. Advantageously, the method is particularly suited to processing radar sensor perception data, which may be relatively noisy. Moreover, the generated reference map does not rely on geometrical features, but also avoids the reporting of duplicate points in the output point cloud.

It will be understood that the embodiments illustrated above show applications only for the purposes of illustration. In practice, embodiments may be applied to many different configurations, the detailed embodiments being straightforward for those skilled in the art to implement.

For example, in the above embodiment, a single occupancy grid is described, with different status evidences being recorded against each cell. But it will be understood that in other embodiments, separate occupancy grids may be used to record occupied and unoccupied states, with both being processed to generate the reference map.

In addition, whilst the above embodiment describes the building of a new reference map, it will be understood that the method is equally applicable to update an existing map, with newly determined cell states being used to update cells in an existing map if the confidence characteristics meet certain criteria, such as having a higher confidence. This may allow, for instance, an optimized central reference map to be used and updated by multiple vehicles.

The term non-transitory computer-readable medium does not encompass transitory electrical or electromagnetic signals propagating through a medium (such as on a carrier wave). Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The term "set" generally means a grouping of one or more elements. The elements of a set do not necessarily need to have any characteristics in common or otherwise belong together. The phrase "at least one of A, B, and C" should be construed to mean a logical (A OR B OR C), using a non-exclusive logical OR, and should not be construed to mean "at least one of A, at least one of B, and at least one of C." The phrase "at least one of A, B, or C" should be construed to mean a logical (A OR B OR C), using a non-exclusive logical OR.

The invention claimed is:

1. A method for building a reference map, the method comprising:
   accumulating perception sensor data for a vehicle moving through an environment;
   generating an occupancy grid from the accumulated sensor data as the vehicle moves, wherein cells in the occupancy grid have a status and a confidence characteristic associated with the respective cell status determined based on the accumulated data; and
   building a reference map for the environment by recording reference map cell states based on the confidence characteristics of the respective cell statuses in the occupancy grid, wherein each cell of the reference map corresponds to a single cell in the occupancy grid,
   wherein, when recording reference map cell states, each reference map cell is assigned a single state based on the confidence characteristics associated with the respective cell in the occupancy grid, and
   wherein building the reference map further includes recording a weight associated with each assigned reference map cell state corresponding to the respective confidence characteristic of the respective cell status in the occupancy grid.

2. The method of claim 1 wherein building the reference map includes recording reference map cells as having an occupied state based on the respective cell statuses in the occupancy grid having confidence characteristics meeting one or more criteria.

3. The method of claim 1 wherein building the reference map includes recording reference map cells as having an unoccupied state based on the respective cell statuses in the occupancy grid having confidence characteristics meeting one or more criteria.

4. The method of claim 1 wherein the perception sensor data includes radar data.

5. The method of claim 1 wherein the occupancy grid includes a plurality of occupancy grid scans generated by a plurality of sensor scan cycles.

6. The method of claim 1 wherein the confidence characteristic associated with the respective cell statuses includes an impact weighting based on a position of the cell relative to the vehicle moving through an environment.

7. The method of claim 1 further comprising uploading the generated reference map to a server.

8. The method of claim 1 wherein the generated reference map is represented as a point cloud.

9. The method of claim 1 further comprising updating the reference map for the environment by:
   comparing stored states for reference map cells with respective cells statuses in the occupancy grid; and
   updating the stored states where the confidence characteristics for the respective cell status meet an update criteria.

10. The method of claim 9 further comprising determining that the update criteria are met in response to the confidence characteristics for the cell statuses indicating a higher confidence level than the weight assigned to the respective stored reference map cell state.

11. The method of claim 1 further comprising:
   receiving reference map data from a vehicle moving through an environment, wherein the reference map data has been generated for the environment by recording reference map cell states based on the confidence characteristics of respective cell statuses in an occupancy grid generated from accumulated perception sensor data at the vehicle; and
   updating the reference map for the environment by:
      comparing the recorded reference map cell states in the reference map data with the respective cell statuses in the reference map and
      updating the cell states where the confidence characteristics for the respective cell status meet an update criteria.

12. An automotive electronic control unit comprising:
   an input configured to accumulate perception sensor data for a vehicle moving through an environment;
   an occupancy grid generating block configured to generate an occupancy grid from the accumulated sensor data as the vehicle moves, wherein cells in the occupancy grid have a status and a confidence characteristic associated with the respective cell status determined based on the accumulated data; and a reference map building block configured to build a reference map for the environment by recording states for reference map cells based on the confidence characteristics of respective cells statuses in the occupancy grid, wherein each cell of the reference map corresponds to a single cell in the occupancy grid.

13. A non-transitory computer-readable medium comprising instructions including:

accumulating perception sensor data for a vehicle moving through an environment;

generating an occupancy grid from the accumulated sensor data as the vehicle moves, wherein cells in the occupancy grid have a status and a confidence characteristic associated with the respective cell status determined based on the accumulated data; and building a reference map for the environment by recording reference map cell states based on the confidence characteristics of the respective cell statuses in the occupancy grid, wherein each cell of the reference map corresponds to a single cell in the occupancy grid, wherein, when recording reference map cell states, each reference map cell is assigned a single state based on the confidence characteristics associated with the respective cell in the occupancy grid, and wherein building the reference map includes recording a weight associated with each assigned reference map cell state based on the respective confidence characteristic of the respective cell status in the occupancy grid.

* * * * *